Oct. 24, 1967  B. G. COX  3,348,816
MIXING MACHINE
Filed Feb. 11, 1966  6 Sheets-Sheet 1

INVENTOR.
BRADLEY G. COX
BY
Learman, Learman & McCulloch
ATTORNEYS

Oct. 24, 1967  B. G. COX  3,348,816
MIXING MACHINE
Filed Feb. 11, 1966  6 Sheets-Sheet 5

INVENTOR.
BRADLEY G. COX
BY
*Learman, Learman & McCulloch*
ATTORNEYS

Oct. 24, 1967

B. G. COX 3,348,816

MIXING MACHINE

Filed Feb. 11, 1966

INVENTOR.
BRADLEY G. COX
BY
Learman, Learman & McCulloch
ATTORNEYS

United States Patent Office 3,348,816
Patented Oct. 24, 1967

3,348,816
MIXING MACHINE
Bradley G. Cox, Saginaw, Mich., assignor to Baker Perkins Inc., Saginaw, Mich., a corporation of New York
Filed Feb. 11, 1966, Ser. No. 534,271
23 Claims. (Cl. 259—41)

This application is a continuation-in-part of applications Ser. Nos. 131,582 and 453,563, filed Aug. 15, 1961, and Apr. 30, 1965, respectively, both now abandoned.

The invention relates to mixing machines and more particularly to mixing machine constructions having cantilever blades which counter-rotate about parallel but non-coincident axes so as to cause an intermeshing action of the blades with consequent multiple shearing effects on the materials being mixed during each revolution of the blades.

Mixers of the class to which the invention relates heretofore have included containers through which two parallel shafts extend and on each of which is mounted a mixing blade. The blades of such machines were so arranged that they either were tangential to one another or overlapped one another. With such machines it was necessary to provide cusp-shaped saddle members on the interior of the container at the central part of the latter to assure sufficient agitation of the material to provide adequate mixing. Such saddle members are difficult and expensive to produce and must be carefully positioned within the confines of the container to provide the proper action. Even with such saddle members, the shearing action imparted to the materials was confined to the region of the saddle member.

As has been indicated, mixing machines of the general class to which the invention pertains heretofore have included a pair of shafts projecting beyond both ends of the mixer container. The presence of two shafts within the container restricts the amount of material which can be mixed within the container. Moreover, each end of the container must be equipped with a pair of journals, bushings, or the like, which not only requires the use of multiple parts but also interferes with the jacketing of the container in those instances where heat exchange apparatus is to be incorporated with the container.

An object of this invention is to provide a mixing machine having mixing blades so constructed and arranged as to effect multiple shearing of material within the container for each revolution of the blades.

Another object of the invention is to provide a mixing machine having blades capable of acting on material to be mixed in such manner as to impart to the material a saddle shear effect, but without requiring the use of saddles.

A further object of the invention is to provide a mixing machine of the kind referred to wherein the mixing blades are arranged to impart a flow action to the material in the container so as to assure a complete and thorough blending of the contents of the container.

Another object of the invention is to provide a mixing machine having intermeshing blades and wherein the blades are so constructed that rotation of each blade imparts to different portions of the material being mixed simultaneous movement in opposite directions to impose multiple shearing forces on such material and provide thorough blending of the material.

Another object of the invention is to provide a mixing machine as hereinbefore specified and wherein the mixing blades are so constructed that during their rotation they provide for an area into and from which material is continuously directed.

A further object of the invention is to provide a mixing machine of the character described wherein each mixing blade is mounted on a shaft which pierces the container at only one place and which occupies only a small fraction of the space within the container, thereby reducing the number of parts required to mount the blades and avoiding restricting the capacity of the mixer by reason of having to accommodate the shafts within the container.

Another object of the invention is to provide a mixing machine having a container which is more easily adapted for jacketing than machines for similar purposes in use heretofore.

A further object of the invention is to provide a mixing machine which requires relatively few parts and less maintenance than machines in use heretofore for similar purposes.

Other objects and advantages of the invention will be pointed out specifically or will become apparent from the following description when it is considered in conjunction with the appended claims and the accompanying drawings, wherein:

Figure 1:
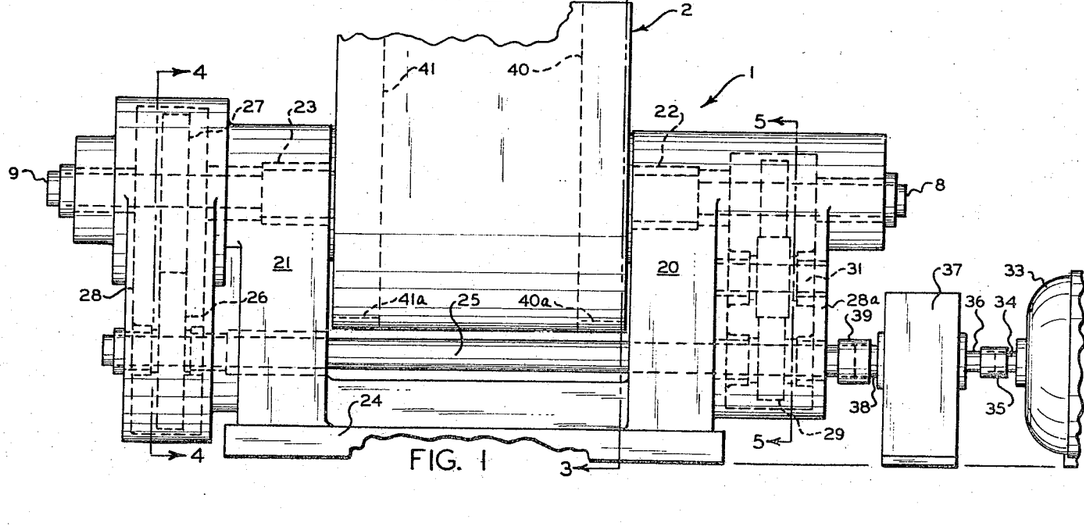
FIGURE 1 is a fragmentary, side elevational view of a mixing machine constructed in accordance with one embodiment of the invention.
Figure 2:
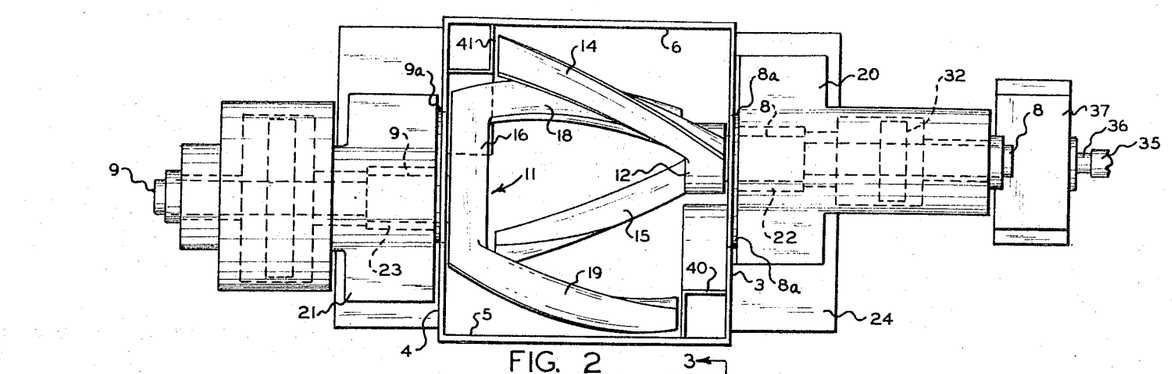
FIGURE 2 is a top plan view of the apparatus shown in FIGURE 1.
Figures 3, 4, 5:
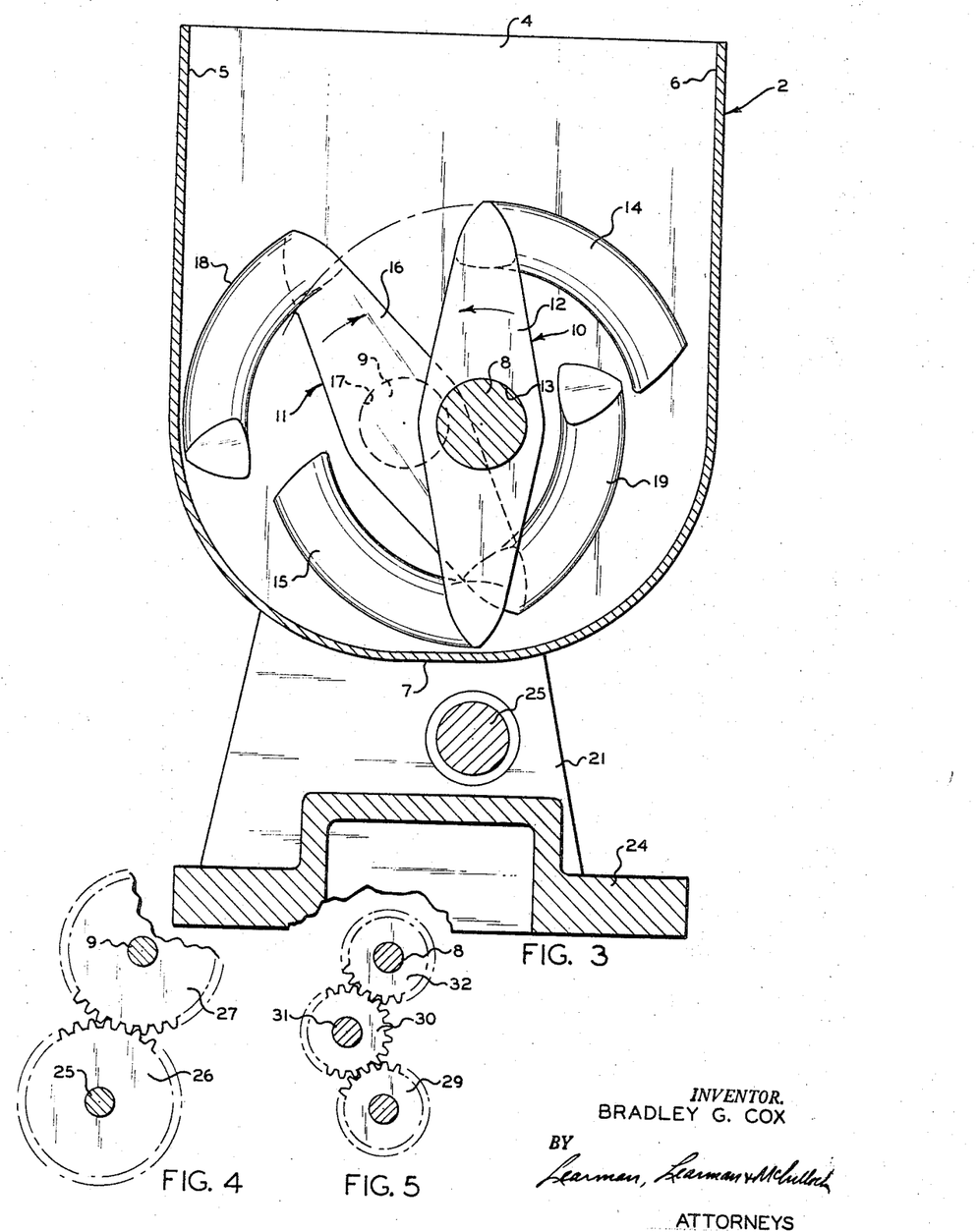
FIGURE 3 is an enlarged, sectional view taken on the line 3—3 of FIGURE 1.
FIGURE 4 is a sectional view taken on the line 4—4 of FIGURE 1.
FIGURE 5 is a sectional view taken on the line 5—5 of FIGURE 1.

A mixing machine constructed in accordance with the invention disclosed in FIGURES 1–7 is represented generally by the reference character 1 and comprises a container or vessel 2 having opposed end walls 3 and 4 and side walls 5 and 6 which are curved at their lower ends and merge to form a substantially flat bottom 7. The container may or may not be equipped with a top closure, depending on the materials being mixed. The end wall 3 is apertured to accommodate a hub 8a carrying a shaft 8, and the end wall 4 is similarly apertured to accommodate a hub 9a carrying a shaft 9. The hubs 8a and 9a for the respective shafts 8 and 9, and the shafts 8 and 9, may be provided with journals and gland devices of any known construction to permit rotation of the shafts relative to the container walls while preventing the escape of fluids through the openings. As is best shown in FIGURE 3, the shaft 8 is mounted to one side of the vertical center line of the container 2 and the shaft 9 is mounted a corresponding distance from the other side of the center line. The shafts 8 and 9 are mounted at the same level, however, so that they are rotatable about horizontally parallel but non-coincident axes.

On the ends of the shafts 8 and 9 which project into the container are mounted mixing blades 10 and 11, respectively. The blade 10 comprises a web section 12 that is provided with a centrally located socket 13 which receives the end of the shaft 8. The shaft 8 projects into the container only a distance sufficient to provide a support for the blade 10. To one end of the web section 12 is joined a cantilever arm 14 and to the other end of the web 12 is joined another cantilever arm 15. The arms 14 and 15 extend toward the opposite end wall 4 of the container, as is shown in FIGURE 2.

The mixing blade 11 includes a web section 16 having a socket 17 which receives the shaft 9 and the latter projects into the container only a distance sufficient to provide support for the blade 11. To one end of the web 16 is joined a cantilever arm 18 and to the other end of the web 16 is joined a second cantilever arm 19. The arms 18 and 19 project toward the end wall 3 of the container. The length of the arms of the blades 10 and 11 are preferably substantially equal in length, and the free ends of each blade's arms project beyond the free ends of the other blade's arms and terminate just short of the plane of the inner surface of the other blade's web section.

Means for mounting the shafts 8 and 9 comprises a pair of upright supports 20 and 21 provided with suitable bearings 22 and 23, respectively, which journal the shafts for rotation. The uprights 20 and 21 are joined to a supporting base 24 which may rest on the floor or other support.

Means for driving the blades comprises a drive shaft 25 which is journaled in both uprights 20 and 21 and projects beyond both of the latter. Fixed adjacent one end of the shaft 25 is a spur gear 26 (FIGURE 4), the teeth of which mesh with the teeth of an identical gear 27 that is mounted fast on the shaft 9. A suitable housing 28 encloses the gears. Adjacent the other end of the shaft 25 is mounted a spur gear 29 (FIGURE 5) that meshes with an idler gear 30 which is fixed on a shaft 31 journaled in a housing 28a. The gear 30 meshes with a gear 32 that is fast on the shaft 8. All of the gears 29, 30, and 32 are of the same size and have the same number of teeth. The arrangement of the driving gears is such that upon rotation of the shaft 25 in a counterclockwise direction, as viewed in FIGURE 3, the blade 10 will rotate in a counterclockwise direction, but the blade 11 will rotate in a clockwise direction and at the same speed of rotation as the blade 10. In some instances it may be desirable to rotate the blades at differential speeds and such rotation may be effected by substituting differential gearing for the gears heretofore described.

Means for driving the shaft 25 may comprise an electric motor 33 having its armature shaft 34 joined by a coupling device 35 to the input shaft 36 of a speed reduction unit 37, the output shaft 38 of which is made fast by a coupling element 39 to the shaft 25.

When assembling the blades in the container, the longitudinal axis of the web of one of the blades preferably is arranged vertically and the longitudinal axis of the other blade preferably is arranged horizontally so that the two blades are 90° out of phase. In FIGURE 3 of the drawings, however, the two blades are shown only 45° out of phase in order to clarify the end view of the blades.

With the blades 10 and 11 90° out of phase, rotation of the blades will cause one arm of one blade to pass between the arms of the other blade each time the blades are rotated 45°, and the arms of the blades will be adjacent one another four times for each revolution of the blades, thereby providing four instances where a saddle type shearing action can be imparted to the material within the container. As a consequence, there is no need to provide saddle members having cusp-like surfaces within the container.

It is preferred to form the arms of the blades 10 and 11 along the arcs of circles corresponding substantially to the curvature of the lower portions of the side walls 5 and 6, and to curve the arms in a direction opposite to the direction of rotation of the blades so that the free ends of the arms trail during rotation of the blades. Substantially the same effect would be obtained, however, if the arms of the blades were curved in such manner that their free ends lead during rotation of the blades. As a result of the curvature imparted to each arm of a blade, each blade, when viewed in end elevation (see FIGURE 3), presents substantially an S-shaped appearance.

The blade 10 is so constructed and positioned within the container that its arms 14 and 15 pass very close to, or engage, the curved lower portion of the side wall 6 so as to pick up material adjacent that wall and move it inwardly of the container. The arms 18 and 19 of the blade 11 similarly pass close to, or engage, the side wall 5 for a similar purpose. In addition, the lateral offset of the shafts 8 and 9 corresponds substantially to the thickness of one of its arms whereby the arms of one blade will pass closely adjacent or engage the arms of the other blade during rotation of the blades so as to keep the arms clean and to increase the shearing effect on the material being mixed.

As is best indicated in FIGURE 3, the cross-sectional shape of each of the arms of the blades 10 and 11 is substantially triangular. As is best indicated in FIGURE 2, each of the blade arms is twisted along its length. Each blade arm is twisted in a direction opposite to the direction in which its associated blade is rotated, with the result that rotation of the blades causes the arms to impart to the material within the container flowing movements longitudinally of the container. The tendency of the blade arms to cause flowing of the material within the container assists the mixing and blending of the contents of the container. The webs 12 and 16 also may be triangularly shaped in section, if desired, to increase the tendency of the blades to impart flow movements to the contents of the container.

Since the free ends of the arms of the respective blades cannot extend so far as to engage the web section of the other blade, two diagonally opposed corners of the container may be so far removed from the influence of the blades as to create dead spots. Such dead spots may be eliminated by providing a pair of right-angular corner pieces 40 and 41 that follow the curvature of the associated end wall and terminate adjacent the vertical center line of the container in an open end as at 40a and 41a. The corner pieces are so arranged that they form hollow chutes that are convenient for introducing materials to the container. If desired, the webs 12 and 16 can be extended beyond their associated arms to pass through openings formed in the corner pieces 40 and 41 to aid in obtaining a proportioning feed rate of material to be mixed.

Each of the blades 10 and 11 is interchangeable with one another. Consequently, all blades can be made identical. Each blade is supported by a single hub, so only one opening need be formed in each end of the container.

The presence of but a single shaft projecting from each end of the container also facilitates the jacketing of the container in those instances where heat exchanger jacketing is desired. Moreover, in such instances a substantial area of the ends of the container may be contacted by the heat exchange medium.

As is best illustrated in FIGURE 2, only a small fraction of the interior of the container is occupied by the shafts 8 and 9 in contrast to those constructions wherein parallel shafts extend completely through and beyond the container. Consequently, the capacity of the container is not limited in any material respect by the presence of blade supporting shafts.

The contents of the container, when mixed, may be removed in a number of ways. For example, the bottom wall 7 of the container may be provided with a trap door (not shown) through which the contents may be removed.

Figures 6, 7:
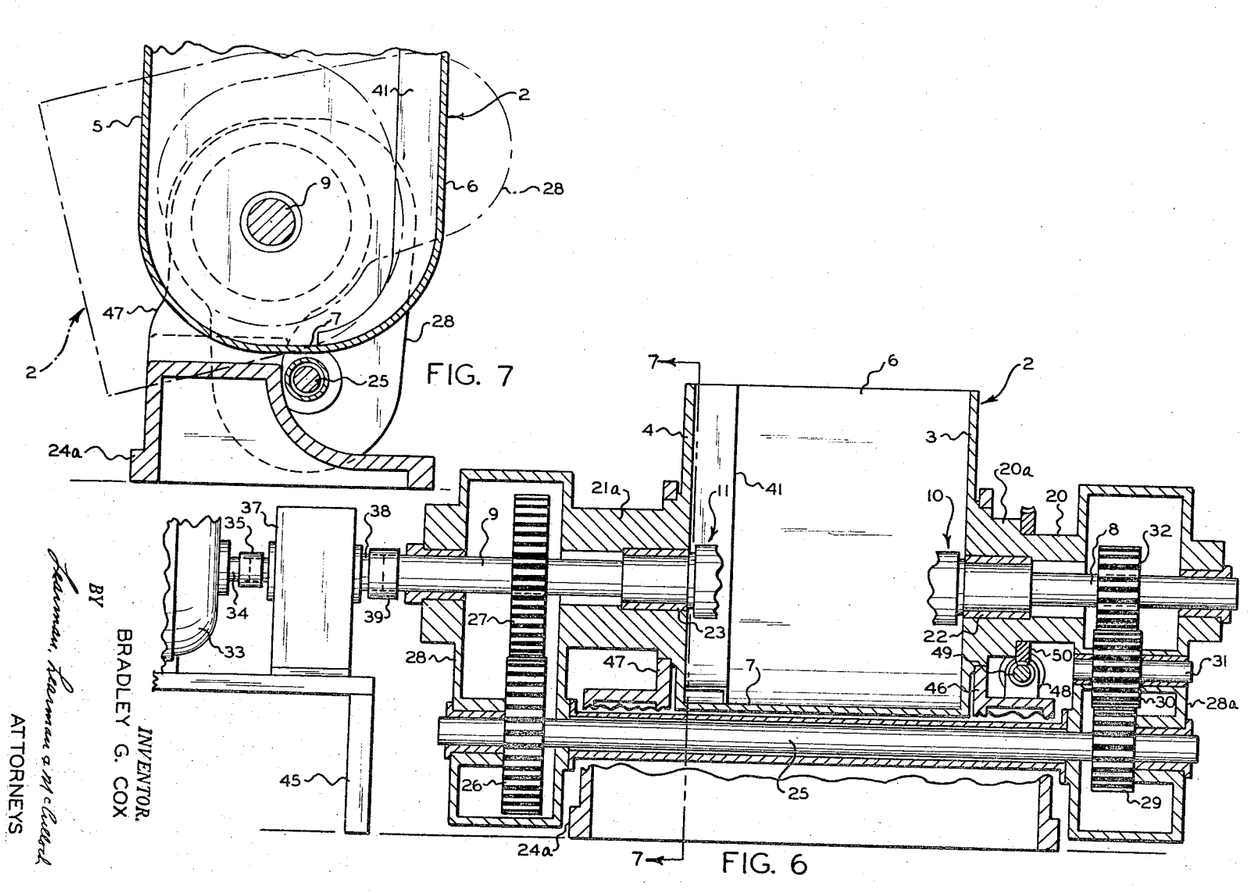
FIGURE 6 is a view similar to FIGURE 3, but illustrating apparatus for tilting the mixer to discharge the contents of the container.
FIGURE 7 is a sectional view taken on the line 7—7 of FIGURE 6, and illustrating both the upright and discharge positions of the container.
Figure 8:
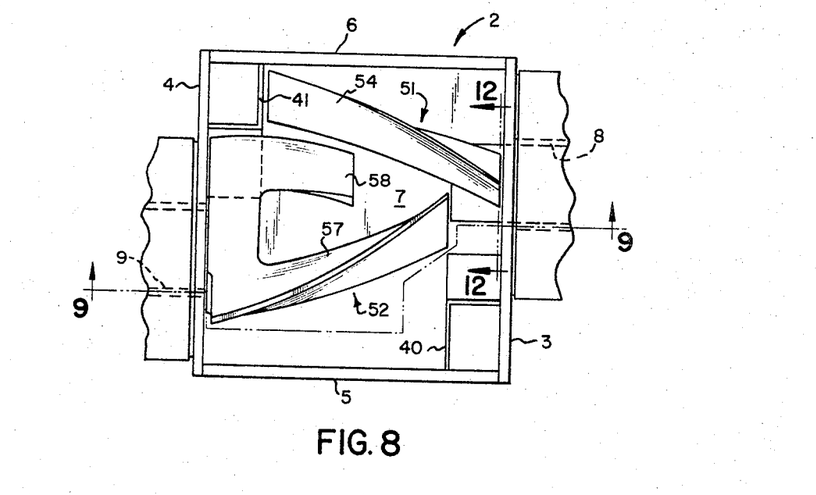
FIGURE 8 is a fragmentary view similar to FIGURE 2, but illustrating a mixer equipped with blades constructed in accordance with another embodiment of the invention.

An alternative embodiment of the invention, wherein the container is tiltable, is disclosed in FIGURES 6 and 7. In the modified construction the driving motor 33 and its associated parts are supported on a support 45 and are coupled directly to the outer end of the shaft 9, so as to free both ends of the drive transmission shaft 25. Since the driving motor is connected directly to the shaft 9, it is necessary that the axis of the shaft 9 constitute the axis about which the container tilts. In order to avoid binding of the shafts 8 and 9, it is necessary that the shaft 8 move orbitally about the axis of the shaft 9 upon tilting of the container.

Means mounting the container 2 for tilting movement about the axis of the shaft 9 comprises a base 24a having upstanding trunnions 46 and 47 in which are journaled housings 20a and 21a, respectively. The housings 20a and 21a replace the supports 20 and 21 and journal the shafts 8 and 9 for rotation. Means for tilting the container comprises a reversible, electric motor 48 mounted on the base 24a and drivingly connected to a worm 49 that meshes with the teeth of a worm gear 50 which is fixed on the housing 20a. Rotation of the motor and the worm in one direction will effect tilting of the container 2 from the position shown in full lines in FIGURE 7 to the position shown in chain lines so as to enable the contents of the container to be drained. Rotation of the motor and worm in the opposite direction will return the container to its upright position.

Although it is preferable to provide two cantilever arms on each of the blades, it would be possible to obtain good mixing results by omitting one of the arms on one of the blades and rotating the single arm blade at twice, or greater, the speed of rotation of the two-arm blade. Alternatively, one arm may be sufficiently offset to provide clearance therebetween. Moreover, more than two arms may be provided on one or both blades, and the blades driven at such speeds, either the same or differential, to produce the desired mixing effects.

The embodiment of the invention disclosed in FIGURES 8–13 is the same as has been described earlier except for differences in the construction of the mixing blades. The modified construction includes a pair of blades 51 and 52 connected respectively to the shafts 8 and 9.

Figure 11:
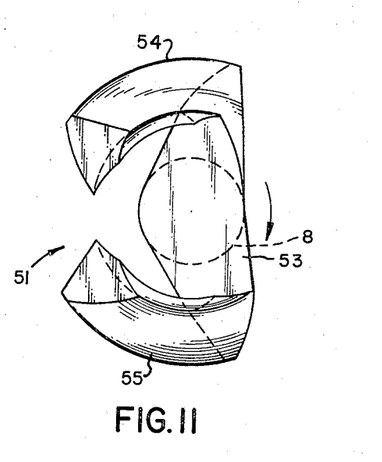
FIGURE 11 is a similar view of the right-hand blade shown in FIGURE 8 as viewed from left to right.

The blade 51 includes a web 53 to which the shaft 8 is joined and from the opposite ends of which extend cantilever arms 54 and 55. Each of the arms is curved to correspond substantially to the curvature of the lower portions of the side walls 6 and 7, but the arms 54 and 55 are curved in opposite directions so that their free ends converge. Thus, as is best shown in FIGURE 11, and assuming that the direction of rotation of the blade 51 is in the direction of the arrow, the arm 54 is curved in such direction that its free end trails during rotation of the blade and the arm 55 is curved in such direction that its free end leads.

Figure 9:
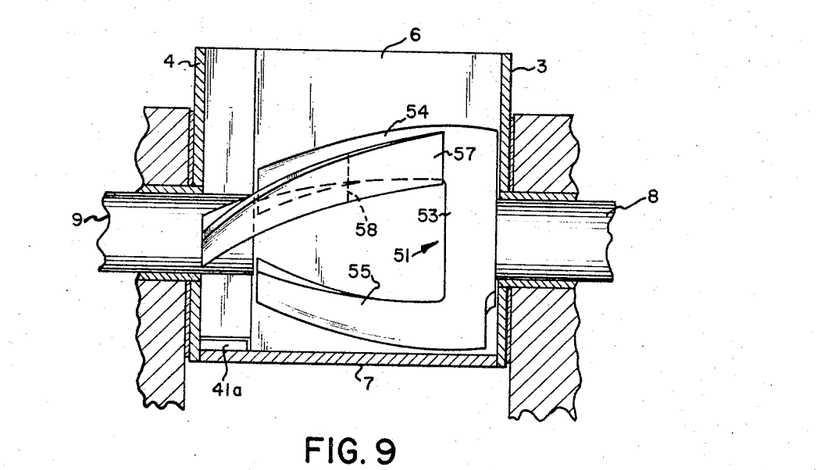
FIGURE 9 is a transverse sectional view taken on the line 9—9 of FIGURE 8.

As is best shown in FIGURE 9, the arms 54 and 55 are of substantially equal length and extend toward the opposite end wall 4. Each of the arms is of substantially triangular configuration, in cross-section, and each arm is twisted along its length. Contrary to the earlier described embodiment, the direction in which the arm 54 is twisted is opposite to the direction in which the arm 55 is twisted. As disclosed in FIGURE 11, the arm 54 is twisted in a counterclockwise direction and the arm 55 is twisted in a clockwise direction. Preferably each arm is twisted along a helix of approximately 30°.

The blade 52 comprises a web 56 to which the shaft 9 is joined and from the opposite ends of which extend cantilever arms 57 and 58. The arm 57 is longer than the arm 58, and each arm is curved to correspond substantially to the curvature of the lower portions of the side walls 6 and 7. The arms 57 and 58, like the arms 54 and 55, are curved in opposite directions so that their free ends converge. Thus, when the blade 52 is rotated in the direction of the arrow in FIGURE 10, the free end of the longer blade 57 leads and the free end of the shorter blade 58 trails.

Each of the arms 57 and 58 is twisted along its length, but the direction of twist of one arm is opposite to the direction of twist of the other. Thus, the arm 57 is twisted clockwise, as viewed in FIGURE 10, and the arm 58 is twisted counterclockwise. Each of the arms preferably is twisted along a helix of approximately 30°.

Figure 10:
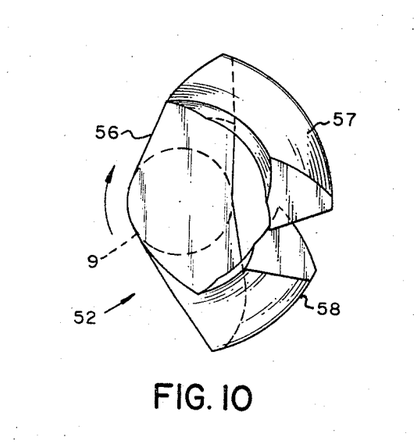
FIGURE 10 is an end elevational view of the left-hand blade shown in FIGURE 8 as viewed from right to left.

As is best shown in FIGURES 10 and 11, the configuration, in plan, of each of the webs 53 and 56 is such that the angular distance from one end to the other, in a clockwise direction, is shorter than the angular distance between the ends in a counterclockwise direction. The direction of curvature of the arms 54 and 55 of the blade 51 is such that they converge along paths having the greater angular length, whereas the direction of curvature of the arms 57 and 58 of the blade 52 is such that they converge along paths having the shorter angular length. Thus, even though the diametral length of each web is the same, and even though the curvature of each blade arm is the same, the arms 57 and 58 converge along lines that intersect one another at a shorter distance from the plane of the associated web than the intersection of the lines of convergence of the arms 54 and 55. The arrangement of the arms 57 and 58 is such that, were it not for the difference in length of the arms, they would physically engage one another.

When the blades 51 and 52 are assembled with their respective shafts 8 and 9, the axes of rotation of the blades are horizontally parallel but non-coincident. Moreover, the blades are rotatable simultaneously by the driving means earlier described at the same speed but in opposite directions. The blades, therefore, must be arranged out of phase with each other to avoid interference between the arms of the respective blades during rotation, but the phase relationship and the lateral spacing of their axes of rotation should be such that an arm of one blade will pass closely adjacent an arm of the other blade so as to effect wiping of the arms. One blade ordinarily will be about 115° out of phase with the other, but in order to illustrate more clearly the relationship of the arms of the respective blades, the phase relationship of the blades is not consistent in the drawings.

Due to the different curvatures and directions of twist of each arm on the respective blades, and due to the different directions of rotation of the blades, different portions of the material in the container 2 will flow in opposite directions in response to rotation of the blades. The construction and arrangement of the blades are such that the material flows along a course leading eventually to a zone adjacent the free end of the shortened arm 57. As additional material is introduced to such zone, the material therein is moved out of the zone for engagement with the blades.

Figure 12:
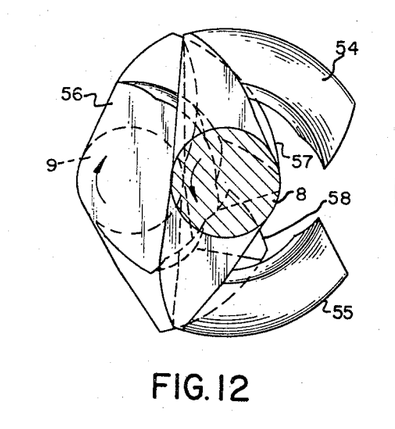
FIGURES 12 and 13 are sectional views taken on the line 12—12 of FIGURE 8 and illustrating the blades in different positions of relative adjustment.
Figure 13:
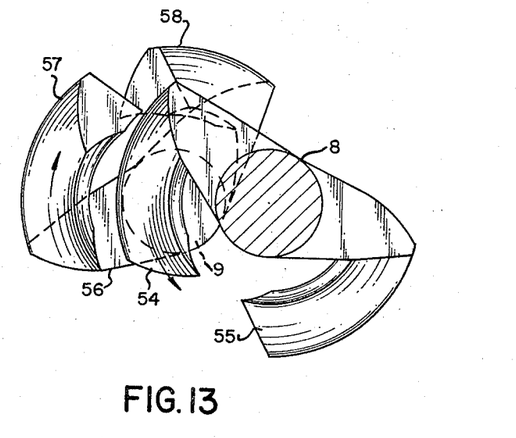

As the blades rotate in opposite directions, the arms of the blades intermesh. That is, one arm of one blade will pass between the arms of the other blade and closely adjacent one arm of the other blade. In contrast to the earlier described embodiment, one arm of the one blade does not move in an orbital path about an arm of the other blade. Instead, the one arm of the one blade enters the space between the two arms of the other blade and then emerges from that position as the blades rotate. For example, the arm 58 is shown in FIGURE 12 as occupying a position between the arms 54 and 55, and the arm 54 is shown in FIGURE 13 as occupying a position between the arms 57 and 58.

Figure 14:
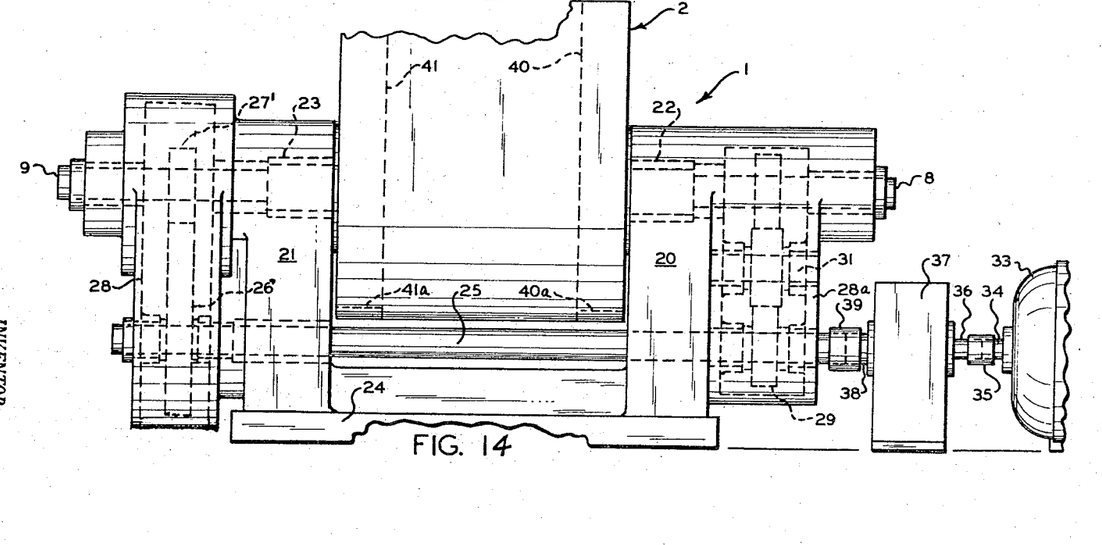
FIGURE 14 is a fragmentary side elevational view of a mixing machine constructed in accordance with a modification of the invention.
Figure 15:
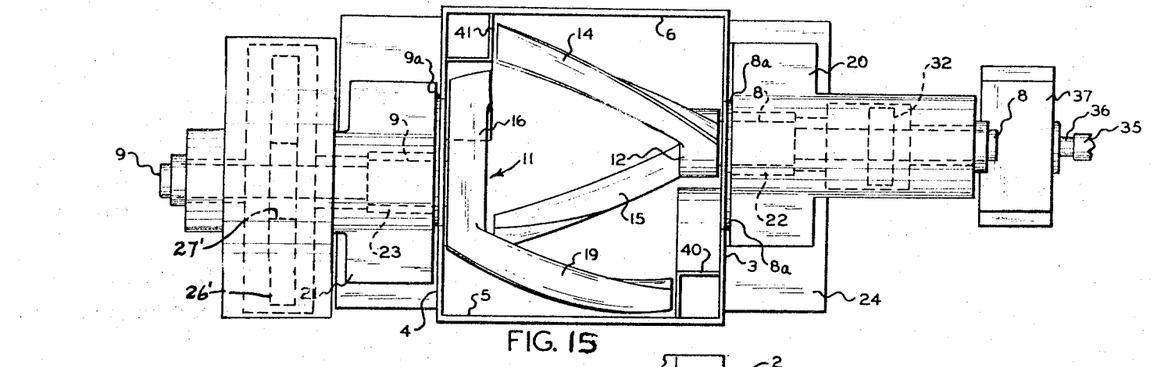
FIGURE 15 is a top plan view thereof.

In FIGURES 14 and 15 I have shown still another embodiment of the invention which is substantially like the embodiment illustrated in FIGURES 1–7, with the exception that the blade 18 is not employed. Further, the blade 11, while rotating in a clockwise direction, is rotated at twice the speed of rotation of the blade 10. This is accomplished by employing differentially diametered gears 26' and 27' in place of the gears 26 and 27 formerly used. Except for these differences, the construction of the mixer is exactly the same as that previously disclosed in FIGURES 1–7. Its operation is also the same except that the arm 19 rotates at twice the speed of the arms 14 and 15.

The disclosed embodiment is representative of a presently preferred form of the invention, but is intended to be illustrative rather than definitive thereof. The invention is defined in the claims.

I claim:

1. A mixing machine comprising a container having opposed, spaced apart end walls; a pair of mixing blades, each of said blades including a pair of spaced apart arms joined to one another at corresponding ends, the other ends of each of said arms being free; means mounting said blades at opposite ends of said container for rotation about substantially parallel but noncoincident axes spaced from one another a distance sufficient to enable an arm of either of said blades to pass between the arms of the other of said blades, the joined ends of one pair of arms being adjacent one of said end walls and the joined ends of the other pair of arms being adjacent the opposed end wall, said free ends of the arms of each of said blades extending toward and beyond the free ends of the arms of the other of said blades; and means for rotating said blades simultaneously.

2. The combination set forth in claim 1 in which the arms are arcuate and the blades are so arranged relatively to one another that their arms are angularly out of phase.

3. A mixing machine comprising a container having opposed, spaced apart end walls; a pair of mixing blades, each of said blades including a web section interposed between and joined to corresponding ends of a pair of spaced apart cantilever arms that extend from the same side of said web section, the spacing between the arms of each of said blades being substantially the same; means connected to the web section of each of said blades and mounting the latter in said container for rotation about substantially parallel but noncoincident axes spaced from one another a distance corresponding substantially to the thickness of one of said arms, the web section of each of said blades being adjacent an end wall of said container and the free ends of the arms of each of said blades extending toward and beyond the free ends of the arms of the other of said blades, said blades being so arranged relatively to one another that their arms are angularly out of phase; and means connected to each of said blades for driving them simultaneously but in opposite directions.

4. A mixing machine comprising a container having spaced apart, opposite end walls; a pair of mixing blades, each of said blades including a web section interposed between and joined to corresponding ends of a pair of spaced apart cantilever arms that extend from the same side of said web section; means connected to the web section of each of said blades and mounting the latter for rotation in said container about substantially parallel but noncoincident axes spaced from one another a distance sufficient to enable an arm of either of said blades to pass between the arms of the other of said blades, the web section of each of said blades being adjacent one of said end walls of said container and the free ends of the arms of each of said blades extending toward and beyond the free ends of the arms of the other of said blades, said blades being so arranged relatively to one another that their arms are angularly out of phase; and means connected to each of said blades for driving them simultaneously at equal speeds but in opposite directions.

5. A mixing machine comprising a container having opposed, spaced apart end walls; a pair of mixing blades, at least one of said blades including a web section interposed between and joined to corresponding ends of a pair of spaced apart cantilever arms that extend from the same side of said web section and the other blade including a web section with a cantilever arm connected thereto; means connected to the web section of each of said blades and mounting the latter in said container for rotation about substantially parallel but noncoincident axes spaced from one another a distance sufficient to enable said arm of the other blade to pass between the arms of said one blade, the web section of each of said blades being adjacent an end wall of said container, and means connected to each of said blades for driving them simultaneously.

6. A cantilever blade construction for a mixing machine, said blade comprising a web section; a first cantilever arm joined at one of its ends to said web section and extending from one side thereof; a second cantilever arm spaced from said first arm joined at one of its ends to said web section and extending from said one side thereof; and means carried by said web section between said arms adapted to mount said web and said arms for rotation about an axis passing between said arms, each of said arms being substantially triangular in cross-section and being twisted along its length, and each of said arms being curved along its length.

7. The construction set forth in claim 6 wherein the length of each of said arms is substantially the same.

8. The construction set forth in claim 6 wherein the length of said arms is different.

9. The construction set forth in claim 6 wherein each of said arms is twisted in a direction opposite to the direction of rotation of said blade.

10. The construction set forth in claim 6 wherein the arms of said blade are twisted in opposite directions.

11. The construction set forth in claim 6 wherein the curvature of the arms of said blade is such that the free end of each of said arms trails when said blade is rotated about said axis.

12. The constructiton set forth in claim 6 wherein the curvature of the arms of said blade is such that the free end of one arm trails and the free end of the other arm leads when said blade is rotated about said axis.

13. A mixing machine comprising a container having opposed end walls; a first shaft journaled in one end wall; a second shaft journaled in the other end wall, said shafts being rotatable about substantially parallel but noncoincident axes; a first blade fixed to said first shaft in said container and having spaced apart cantilever arms located on opposite sides of the axis of rotation of said first shaft; a second blade fixed to said second shaft in said container and having spaced apart cantilever arms located on opposite sides of the axis of rotation of said second shaft, the arms of each of said first and second blades being of such length that the arms of each blade extend beyond the free ends of the arms of the other blade, the spacing between the arms of said blades and the spacing between said axes being such that rotation of said blades about their respective axes causes an arm of each of said blades to pass between the arms of the other of said blades; and means connected to said shafts externally of said container for rotating them simultaneously.

14. The construction set forth in claim 13 wherein the arms of each of said blades are twisted over their length.

15. The construction set forth in claim 13 wherein the arms of each of said blades are curved along their length.

16. The construction set forth in claim 15 wherein the arms of each of said blades are twisted over their length in a direction opposite to the direction of rotation thereof.

17. The construction set forth in claim 16 wherein said blades are rotated in opposite directions.

18. The construction set forth in claim 13 wherein the arms of said blades are angularly out of phase with one another.

19. The construction set forth in claim 18 wherein the arms of said blades are 90° out of phase.

20. The construction set forth in claim 13 including means mounting said container for tilting movements about the axis of one of said shafts.

21. A mixing machine comprising a container having upstanding side walls curved adjacent their lower ends to form a bottom; a pair of intermeshing mixing blades therein, each of said blades including a pair of arms joined to one another at corresponding ends, the other ends of each of said arms being free, each of said arms being curved along its length along an arc corresponding substantially to the curvature of said lower ends of said side walls; means mounting said blades at opposite ends of said container for rotation about substantially parallel axes and with the free ends of the arms of each blade extending toward and beyond the free ends of the arms of the other blade and terminating short of the joined ends of the arms thereof; and means for rotating said blades simultaneously.

22. The apparatus set forth in claim 21 wherein said axes are noncoincident.

23. The apparatus set forth in claim 22 including means mounting said container for tilting movements about one of said axes.

References Cited

UNITED STATES PATENTS

| | | | |
|---|---|---|---|
| 375,384 | 12/1887 | Quak | 259—104 |
| 375,568 | 12/1887 | Peters | 259—41 |
| 376,625 | 1/1888 | Barnesley | 259—104 |
| 722,113 | 3/1903 | Koelner | 259—110 |
| 833,089 | 10/1906 | Scheuch | 259—41 |
| 939,392 | 11/1909 | Chambers | 259—104 |
| 950,243 | 2/1910 | Ross | 259—41 |
| 967,891 | 8/1910 | Earnest | 259—104 |
| 1,005,769 | 10/1911 | Chambers | 259—104 |
| 1,256,854 | 2/1918 | Wickliffe | 259—136 |
| 1,374,765 | 4/1921 | Owen | 259—105 |
| 1,426,444 | 8/1922 | Allison | 259—109 |
| 2,559,418 | 7/1951 | Ford | 259—104 |
| 2,794,626 | 6/1957 | Sterritt | 259—104 |
| 2,838,780 | 6/1958 | Kean | 259—104 |
| 2,850,268 | 9/1958 | Miller et al. | 259—104 |
| 2,867,419 | 1/1959 | Heinzerling | 259—104 |

FOREIGN PATENTS 383,886  11/1932  Great Britain.

WALTER A. SCHEEL, *Primary Examiner.*
R. W. JENKINS, *Assistant Examiner.*